(12) United States Patent
Machii et al.

(10) Patent No.: US 11,496,647 B2
(45) Date of Patent: Nov. 8, 2022

(54) INFORMATION PROCESSING APPARATUS

(71) Applicant: FUJIFILM Business Innovation Corp., Tokyo (JP)

(72) Inventors: Yusuke Machii, Kanagawa (JP); Takuji Tahara, Kanagawa (JP); Yusuke Yamaura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 18 days.

(21) Appl. No.: 17/338,689

(22) Filed: Jun. 4, 2021

(65) Prior Publication Data

US 2022/0150380 A1 May 12, 2022

(30) Foreign Application Priority Data

Nov. 12, 2020 (JP) .............................. JP2020-188931

(51) Int. Cl.
*H04N 1/40* (2006.01)
*H04N 1/00* (2006.01)
(Continued)

(52) U.S. Cl.
CPC ....... *H04N 1/40062* (2013.01); *G06N 3/0454* (2013.01); *G06N 3/08* (2013.01);
(Continued)

(58) Field of Classification Search
CPC ........... H04N 1/40062; H04N 1/00037; G06N 3/0454; G06N 3/08; G06T 7/40; G06T 2207/10008; G06T 2207/20081
See application file for complete search history.

(56) References Cited

U.S. PATENT DOCUMENTS

| 8,711,446 B2 | 4/2014 | Imai |
| 10,867,411 B2 | 12/2020 | Totsuka |
| 2019/0025598 A1* | 1/2019 | Kobayashi ............. H04N 1/387 |

FOREIGN PATENT DOCUMENTS

| JP | 4024737 | 12/2007 |
| JP | 5760562 | 8/2015 |
| JP | 6708462 | 6/2020 |

OTHER PUBLICATIONS

Vijay Badrinarayanan et al."SegNet: A Deep Convolutional Encoder-Decoder Architecture for Image Segmentation" In arXiv:1511.00561, submitted on Oct. 10, 2016 (v3), from https://arxiv.org/abs/1511.00561.
(Continued)

*Primary Examiner* — King Y Poon
*Assistant Examiner* — Michael L Burleson
(74) *Attorney, Agent, or Firm* — JCIPRNET

(57) ABSTRACT

An information processing apparatus includes a processor configured to convert the values of pixels in a glossy region of process target image data by inputting the process target image data to a first learning unit that has been trained using, as first learning data, first read image data and second read image data so as to convert the first read image data into the second read image data. The glossy region corresponds to a glossy portion of a document. The first read image data include the glossy region, and are obtained by optically reading the document in a first reading environment in which the light amount of regularly reflected light from a learning data document acquired by an image sensor is less than a regularly reflected light amount threshold. The second read image data include the glossy region, and are obtained by optically reading the document in a second reading environment in which the light amount of the regularly reflected light acquired by the image sensor is equal to or more than the regularly reflected light amount threshold. The
(Continued)

process target image data are obtained by optically reading a process target document in the first reading environment.

15 Claims, 11 Drawing Sheets

(51) Int. Cl.
*G06T 7/40* (2017.01)
*H04N 1/03* (2006.01)
*H04N 1/028* (2006.01)
*G06N 3/08* (2006.01)
*G06N 3/04* (2006.01)
*G06T 7/11* (2017.01)
*H04N 1/10* (2006.01)

(52) U.S. Cl.
CPC .................. *G06T 7/11* (2017.01); *G06T 7/40* (2013.01); *H04N 1/00005* (2013.01); *H04N 1/00037* (2013.01); *H04N 1/02815* (2013.01); *H04N 1/03* (2013.01); *H04N 1/40068* (2013.01); *G06T 2207/10008* (2013.01); *G06T 2207/20081* (2013.01); *G06T 2207/20092* (2013.01); *H04N 1/1061* (2013.01)

(56) References Cited

OTHER PUBLICATIONS

Phillip Isola et al. "Image-to-Image Translation with Conditional Adversarial Networks" In arXiv:1611.07004, submitted on Nov. 26, 2018 (v3), from https://arxiv.org/pdf/1611.07004.pdf.

\* cited by examiner

INFORMATION PROCESSING APPARATUS

CROSS-REFERENCE TO RELATED APPLICATIONS

This application is based on and claims priority under 35 USC 119 from Japanese Patent Application No. 2020-188931 filed Nov. 12, 2020.

BACKGROUND

(i) Technical Field

The present disclosure relates to an information processing apparatus.

(ii) Related Art

There has hitherto been known an image reading device (scanner) that radiates light from a light source to a document, receives reflected light from the document using an image sensor, and generates read image data that represent the document.

When light is radiated to the document, the luminous flux of regularly reflected light may be fluctuated in accordance with the surface properties (such as whether or not the surface is glossy, for example) of the document. The regularly reflected light refers to reflected light, the reflection angle of which is equal to the angle of incidence of incident light to the document. The luminous flux refers to the light amount per unit time. That is, the light amount is a time integration of the luminous flux. The light amount may alternatively be referred to as "light energy". That is, when the image sensor is disposed so as to receive regularly reflected light, the image quality (such as lightness, for example) of read image data may be fluctuated in accordance with the surface properties of the document. On the other hand, the luminous flux of diffused reflected light (reflected at various reflection angles), which is reflected light other than the regularly reflected light, is not fluctuated significantly in accordance with the surface properties of the document.

Thus, in an image reading device according to the related art, in general, as illustrated in FIG. 15, an image sensor Se is disposed so as to receive reflected light reflected in a direction that is perpendicular to an incidence position P of a document Sc placed on a document platen PL, and a light source L is disposed such that the angle of incident of incident light I to the document Sc (specifically, the incidence position P) is about 45°. With such a configuration, the image sensor Se does not substantially receive regularly reflected light R, but principally receives diffused reflected light D which is indicated by broken lines, and therefore fluctuations in the image quality of read image data due to the difference in the surface properties of the document Sc are suppressed. Since the light amount of the regularly reflected light R is large, the image quality of read image data generated on the basis of the regularly reflected light R may be lowered, such as the brightness of pixels becoming too high (white-out). Thus, a high image quality may advantageously be achieved by generating read image data principally on the basis of the diffused reflected light D.

A document occasionally includes a glossy portion that is highly glossy. The glossy portion may be defined as a portion in which the regular reflectance is a predetermined reflectance or more. The regular reflectance is the proportion of the luminous flux of light (i.e. regularly reflected light) reflected from the document surface at a reflection angle that is equal to a certain incident angle, to the luminous flux of light that is incident at the incident angle. The regular reflectance is occasionally referred to as a "mirror reflectivity".

That is, reflected light from the glossy portion is considered to include a high luminous flux of regularly reflected light and a low luminous flux of diffused reflected light. Thus, a sufficient amount of diffused reflected light may not be obtained from the glossy portion with a common image reading device according to the related art, which generates read image data principally on the basis of diffused reflected light. Consequently, a glossy region corresponding to the glossy portion of the document may be dark in the read image data, and a glossy texture as in the document may not be expressed in the read image data. The glossy texture stands for a texture corresponding to a texture felt when a human sees the glossy portion of the document. Herein, as discussed above, a portion (pixel group) of image data corresponding to the "glossy portion" of the document is referred to as a "glossy region". Meanwhile, a portion other than the glossy portion of the document is referred to as a "non-glossy portion". A portion (pixel group) of image data corresponding to the "non-glossy portion" of the document is referred to as a "non-glossy region".

In order to address the above issue, there has hitherto been proposed a technique of expressing a glossy texture of a glossy region corresponding to a glossy portion of a document in read image data obtained by reading the document.

Japanese Patent No. 4024737, for example, discloses an image reading device that obtains first read image data through normal scanning, and that obtains second read image data (in which a glossy texture of a glossy region is expressed) through scanning performed with a reflected light control member, which irregularly reflects light, disposed between a light source and a document. In the image reading device, a glossy portion is detected from the document on the basis of the first read image data and the second read image data, and a combining process in which the second read image data are selected for pixels located in a glossy region of read image data and the first read image data are selected for pixels located in a non-glossy region of the read image data is performed to combine the first read image data and the second read image data. Consequently, read image data in which a glossy texture of a glossy region is expressed are generated.

Meanwhile, Japanese Patent No. 5760562, for example, discloses an image reading device that includes one light source and a plurality of image sensors disposed so as to receive reflected light from a document due to incident light from the light source in directions at different reflection angles. In the image reading device, values read by the plurality of image sensors are compared to determine whether or not pixels to be determined are included in a glossy region, and pixels in the glossy region are subjected to appropriate image processing to express a glossy texture that is equivalent to a glossy portion of the document in the glossy region.

SUMMARY

It has hitherto been necessary to use a plurality of read image data generated through reading processes performed in a plurality of reading environments, in order to express a glossy texture of a glossy region corresponding to a glossy portion of a document in read image data obtained by optically reading the document.

Aspects of non-limiting embodiments of the present disclosure relate to expressing a glossy texture of a glossy region of read image data without using a plurality of read image data, which are based on reflected light from a document including regularly reflected light in mutually different amounts and generated through reading processes performed in a plurality of reading environments, in a conversion process of converting pixel values in a glossy region of read image data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to convert values of pixels in a glossy region of process target image data by inputting the process target image data to a first learning unit that has been trained using, as first learning data, first read image data and second read image data so as to convert the first read image data into the second read image data, the glossy region corresponding to a glossy portion of a document, the first read image data including the glossy region and being obtained by optically reading the document in a first reading environment in which a light amount of regularly reflected light from a learning data document acquired by an image sensor is less than a regularly reflected light amount threshold, the second read image data including the glossy region and being obtained by optically reading the document in a second reading environment in which the light amount of the regularly reflected light acquired by the image sensor is equal to or more than the regularly reflected light amount threshold, and the process target image data being obtained by optically reading a process target document in the first reading environment.

BRIEF DESCRIPTION OF THE DRAWINGS

An exemplary embodiment of the present disclosure will be described in detail based on the following figures, wherein.

DETAILED DESCRIPTION

Figure 1:
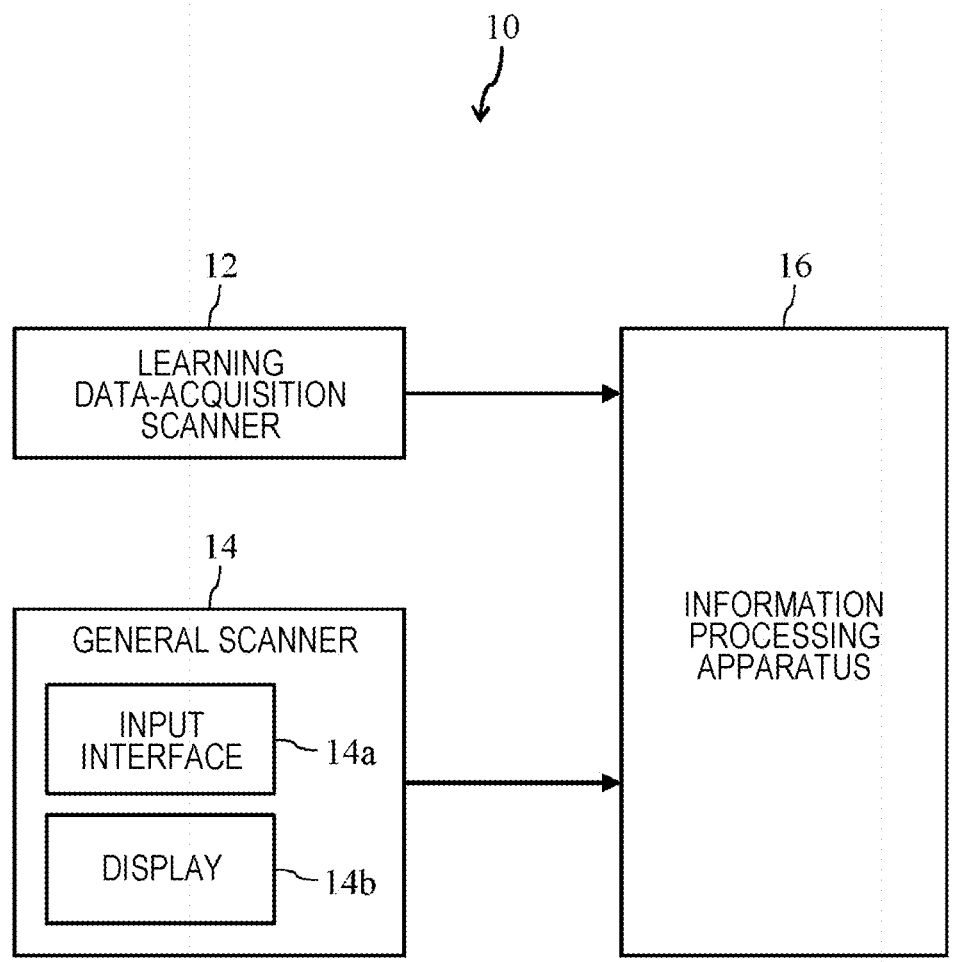
FIG. 1 illustrates a schematic configuration of an information processing system according to the present exemplary embodiment.

FIG. 1 illustrates a schematic configuration of an information processing system 10 according to the present exemplary embodiment. The information processing system 10 is configured to include a learning data-acquisition scanner 12, a general scanner 14, and an information processing apparatus 16.

The learning data-acquisition scanner 12 is an image reading device that optically reads a document such as a paper medium to acquire read image data that represent the document. The learning data-acquisition scanner 12 may be any device that is capable of executing an optical reading process (i.e. a scan process) and that has the structure described below. For example, the learning data-acquisition scanner 12 may be a scanner, a multi-function device that has a scan function, etc. As discussed later, the information processing apparatus 16 includes a learning unit, and the learning data-acquisition scanner 12 is exclusively used to acquire read image data as learning data for learning of the learning unit. While one learning data-acquisition scanner 12 is illustrated in FIG. 1, the information processing system 10 may include a plurality of learning data-acquisition scanners 12.

Figure 2:
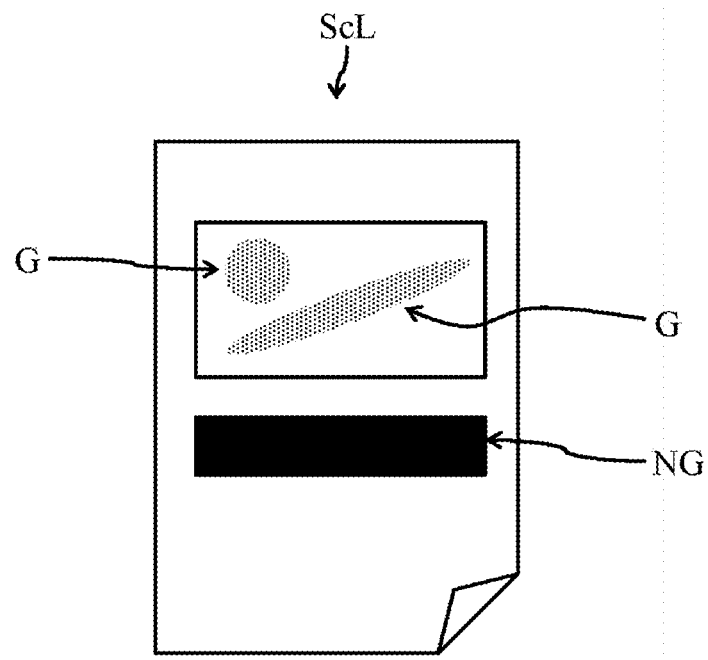
FIG. 2 illustrates an example of a learning data document.

FIG. 2 illustrates an example of a learning data document ScL to be read by the learning data-acquisition scanner 12. The document ScL to be read by the learning data-acquisition scanner 12 includes a glossy portion G which is highly glossy and a non-glossy portion NG which is a portion other than the glossy portion. In the drawings of the present application, the glossy portion G of the document and a glossy region of the read image data in which a glossy texture is expressed are represented as shaded. As discussed above, the glossy portion G is defined as a portion in which the regular reflectance is equal to or more than a predetermined reflectance. On the other hand, the non-glossy portion NG is considered as a portion in which the regular reflectance is less than the predetermined reflectance. The learning data document ScL may be a single document ScL that includes a glossy portion G and a non-glossy portion NG in a mixed manner, or may be a document ScL, the entire surface of which is a glossy portion G or a non-glossy portion NG. The learning data-acquisition scanner 12 may read a plurality of documents ScL so that a plurality of read image data include both a glossy region and a non-glossy region. Such a plurality of read image data are used as learning data for learning of the learning unit to be discussed later.

The learning data-acquisition scanner 12 may read the document ScL in a first reading environment and a second reading environment, which are different from each other, to generate read image data. Herein, the read image data generated in the first reading environment are referred to as "first read image data", and the read image data generated in the second reading environment are referred to as "second read image data". The first reading environment and the second reading environment will be discussed in detail later. The first reading environment is a reading environment that is equivalent to that of a common image reading device according to the related art. The first read image data acquired in the first reading environment are image data in which a non-glossy region is expressed suitably but the glossy texture of a glossy region is not expressed suitably. On the other hand, the second read image data acquired in the second reading environment are image data in which the glossy texture of a glossy region is expressed suitably but a non-glossy region is not expressed suitably, with the brightness being too high, for example. The learning data-acquisition scanner 12 transmits the first read image data and the second read image data to the information processing apparatus 16.

Figure 3:
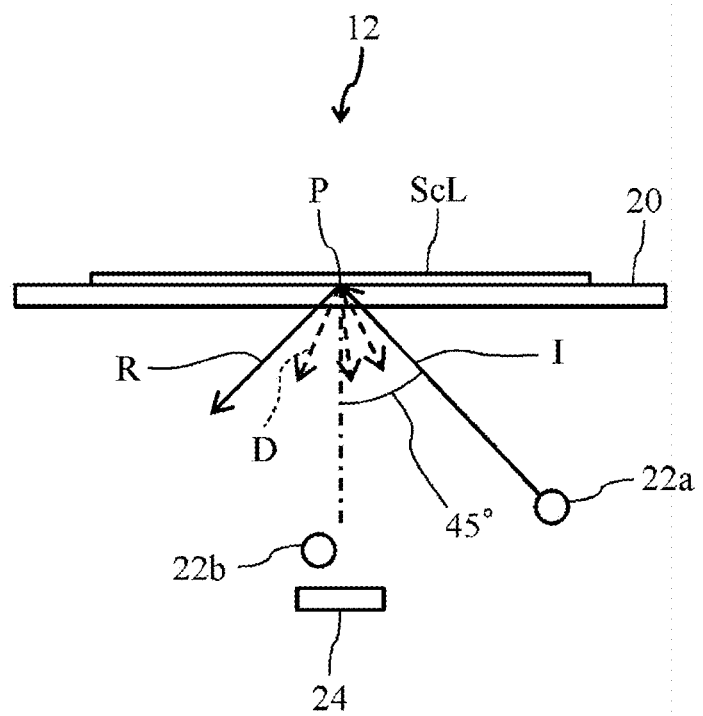
FIG. 3 is a first schematic diagram illustrating the structure of a learning data-acquisition scanner.

FIG. 3 is a schematic diagram illustrating the structure of the learning data-acquisition scanner 12. The learning data-acquisition scanner 12 is configured to include a document platen 20, a first light source 22a, a second light source 22b, and an image sensor 24.

The document platen 20 is a plate-shaped member formed from an optically transparent substance such as glass, for example, and disposed so as to extend on a horizontal plane. The learning data document ScL is placed on the document platen 20.

The first light source 22a and the second light source 22b are each formed as a light emitting element array in which light emitting elements such as white fluorescent lamps are arranged in the horizontal direction (direction of the depth of the sheet surface in the examples in FIGS. 2 and 3), for example. The first light source 22a and the second light source 22b are provided under the document platen 20, and radiate light toward a surface (lower surface) of the document ScL. In a single scan process, the first light source 22a and the second light source 22b do not emit light at the same time, but only one of the light sources emits light.

The image sensor 24 is constituted as an imaging element array in which imaging elements that convert light into an electric signal, such as charge-coupled device (CCD) image sensors, are arranged in the horizontal direction, specifically the same direction (direction of the depth of the sheet surface in the examples in FIGS. 2 and 3) as the direction in which the light emitting elements are arranged, for example. The image sensor 24 receives reflected light from a surface (lower surface) of the document ScL due to light radiated from the first light source 22a or the second light source 22b to the document ScL. The image sensor 24 is also provided under the document platen 20. In particular, the image sensor 24 is disposed directly below an incidence position P of the document ScL, at which light from the first light source 22a and the second light source 22b is incident. The image sensor 24 is provided in parallel with the document platen 20 (i.e. the document ScL which is placed on the document platen 20). Consequently, the image sensor 24 receives reflected light that travels in the vertical direction from the incidence position P of the document ScL. While the image sensor 24 is illustrated as directly receiving reflected light from the document ScL in FIG. 3, a plurality of mirrors or lenses that reflect the reflected light to further change the travel direction of the reflected light may be provided in the middle of an optical path for the reflected light from the document ScL to the image sensor 24. Even in the case where a plurality of mirrors or lenses are provided, the image sensor 24 still receives reflected light that travels in a direction that is perpendicular to the document ScL.

In the process of scanning the document ScL, the first light source 22a, the second light source 22b, and the image sensor 24 integrally move in the horizontal direction (right-left direction in the example in FIG. 3), which is perpendicular to the direction of arrangement of the light emitting elements and the imaging elements. Consequently, the incidence position P is moved so that the image sensor 24 receives reflected light from various portions of the document ScL. The learning data-acquisition scanner 12 generates read image data that represent the document ScL on the basis of the reflected light received by the image sensor 24.

Subsequently, a scan process performed in the first reading environment in which the first light source 22a is used will be described with reference to FIG. 3. The first light source 22a is disposed such that the incident angle, which is the angle between the travel direction of incident light I radiated from the first light source 22a and a direction (direction indicated by the dot-and-dash line in FIG. 3) that is perpendicular to the document ScL which is placed on the document platen 20 is 45°. Consequently, the reflection angle of regularly reflected light R reflected from a surface (specifically, the incidence position P) of the document ScL (angle between the regularly reflected light R and a direction that is perpendicular to the document ScL which is placed on the document platen 20) is also 45°. Thus, the image sensor 24 which is disposed so as to receive reflected light that travels in the vertical direction from the incidence position P of the document ScL at which the incident light I is incident does not substantially receive the regularly reflected light R due to light from the first light source 22a. In other words, in the scan process in which the first light source 22a is used, the light amount of the regularly reflected light R from the document ScL acquired by the image sensor 24 is considered to be less than a predetermined regularly reflected light amount threshold.

On the other hand, diffused reflected light D due to light from the first light source 22a, which is indicated by the broken lines in FIG. 3, is reflected at various reflection angles from the incidence position P of the document ScL. Thus, the image sensor 24 receives a greater amount of the diffused reflected light D due to light from the first light source 22a (in a light amount that is at least greater than the light amount of the regularly reflected light R).

Figure 4:
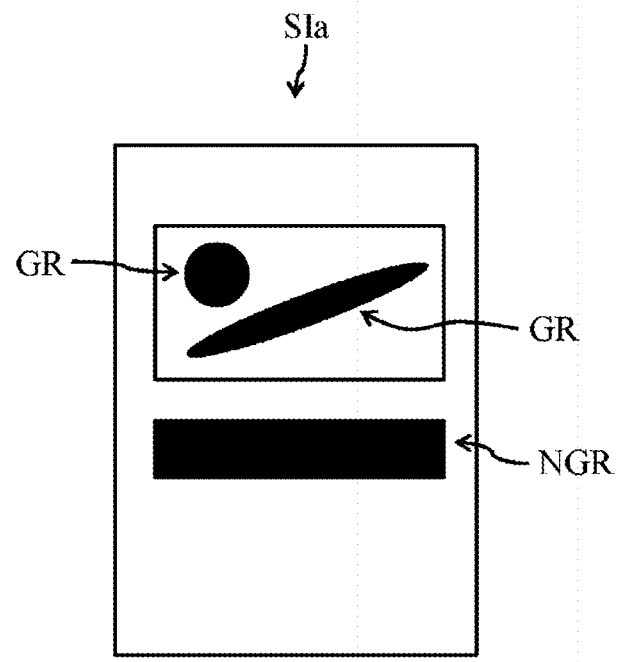
FIG. 4 illustrates an example of first read image data.

FIG. 4 illustrates an example of first read image data SIa generated by reading the document ScL illustrated in FIG. 2 through a scan process in which the first light source 22a is used. In the scan process in which the first light source 22a is used, the first read image data SIa are generated principally on the basis of the diffused reflected light D. Thus, as discussed above, in the first read image data SIa, fluctuations in the image quality of the first read image data SIa due to the difference in the surface properties of the document ScL are suppressed, and a non-glossy region NGR corresponding to the non-glossy portion NG of the document ScL has a high image quality (e.g. the brightness, lightness, and saturation of pixels in the non-glossy region NGR have values that are suitable to express the non-glossy portion NG). On the other hand, reflected light from the glossy portion G of the document ScL contains a great amount of the regularly reflected light R and a small amount of the diffused reflected light D. Therefore, in the first read image data SIa, a sufficient amount of the diffused reflected light D may not be obtained from the glossy portion G of the document ScL. Thus, a glossy region GR corresponding to the glossy portion G of the document ScL is dark, and the glossy texture of the glossy region GR is not expressed suitably. In particular, the lightness of pixels in the glossy region GR is considerably low. In FIG. 4, such a phenomenon is expressed by the glossy region GR being colored black.

As seen through a comparison between FIG. 3 and FIG. 15, the first reading environment is considered to be equivalent to the reading environment for the scan process by the image reading device according to the related art described with reference to FIG. 15.

In the present exemplary embodiment, in the first reading environment, the incident angle of the incident light I from the first light source 22*a* is determined as 45° with the image sensor 24 disposed so as to receive reflected light that travels in the vertical direction from the incidence position P of the document ScL at which the incident light I is incident. However, the incident angle of the incident light I from the first light source 22*a* and the position of arrangement of the image sensor 24 are not limited thereto as long as the light amount of the regularly reflected light R from the document ScL acquired by the image sensor 24 is less than the predetermined regularly reflected light amount threshold.

Figure 5:
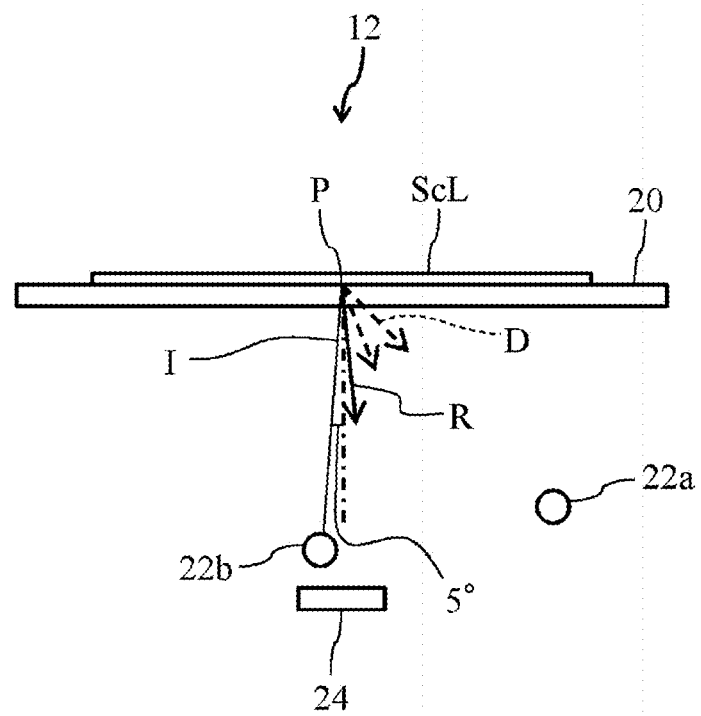
FIG. 5 is a second schematic diagram illustrating the structure of the learning data-acquisition scanner.

Next, a scan process performed in the second reading environment in which the second light source 22*b* is used will be described with reference to FIG. 5. The second light source 22*b* is disposed such that the incident angle, which is the angle between the travel direction of incident light I radiated from the second light source 22*b* and a direction (direction indicated by the dot-and-dash line in FIG. 5) that is perpendicular to the learning data document ScL which is placed on the document platen 20 is 5°. Consequently, the reflection angle of regularly reflected light R reflected from a surface (specifically, the incidence position P) of the document ScL (angle between the regularly reflected light R and a direction that is perpendicular to the document ScL which is placed on the document platen 20) is also 5°. Thus, the image sensor 24 which is disposed so as to receive reflected light that travels in the vertical direction from the incidence position P of the document ScL at which the incident light I is incident is able to receive the regularly reflected light R due to light from the second light source 22*b*. In other words, in the scan process in which the second light source 22*b* is used, the light amount of the regularly reflected light R from the document ScL acquired by the image sensor 24 is considered to be equal to or more than the predetermined regularly reflected light amount threshold. The light amount of the regularly reflected light R from the document ScL acquired by the image sensor 24 in the scan process in which the second light source 22*b* is used is at least greater than that in the case of the scan process in which the first light source 22*a* is used.

Figure 6:
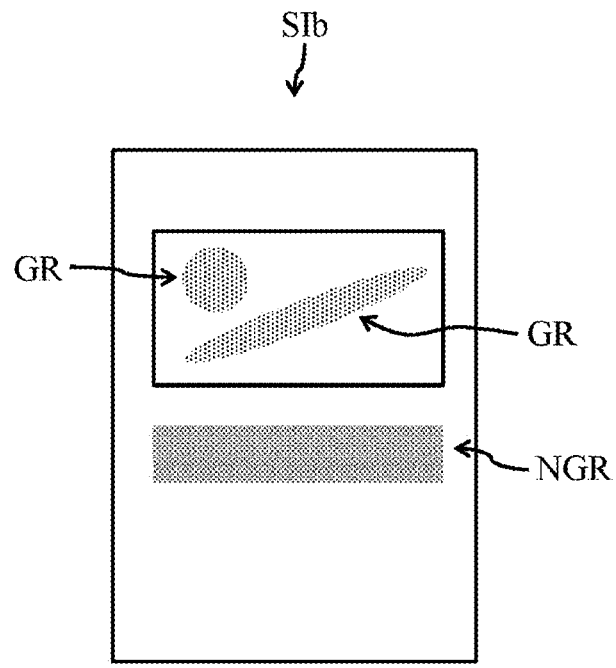
FIG. 6 illustrates an example of second read image data.

FIG. 6 illustrates an example of second read image data SIb generated by reading the document ScL illustrated in FIG. 2 through a scan process in which the second light source 22*b* is used. In the scan process in which the second light source 22*b* is used, the image sensor 24 generates the second read image data SIb on the basis of the regularly reflected light R and the diffused reflected light D. Since the light amount of the regularly reflected light R is much greater than the light amount of the diffused reflected light D, however, the image sensor 24 is considered to generate the second read image data SIb principally on the basis of the regularly reflected light R. Thus, in the second read image data SIb, the glossy texture of the glossy region GR corresponding to the glossy portion G of the document ScL is expressed at least better than in the first read image data SIa. That is, the lightness of pixels in the glossy region GR is considerably high, since the image sensor 24 receives a great light amount of the regularly reflected light R reflected from the glossy portion G. This is one reason that the glossy texture is expressed suitably. It is considered that not only the lightness of pixels but also the saturation, hue, etc. are also involved in order for the glossy texture to be expressed well. In any case, the reason that the glossy texture of the glossy region GR is expressed suitably is that the image sensor 24 generates the second read image data SIb principally on the basis of the regularly reflected light R from the document ScL. In the second read image data SIb, on the other hand, an excessive light amount of reflected light is obtained from the non-glossy portion NG of the document ScL, and therefore a white-out is caused in the non-glossy region NGR corresponding to the non-glossy portion NG of the document ScL, and the image quality of the non-glossy region NGR is not better than that in the first read image data SIa (such as the lightness of pixels in the non-glossy region NGR being too high, for example).

In the present exemplary embodiment, in the second reading environment, the incident angle of the incident light I from the second light source 22*b* is determined as 5° with the image sensor 24 disposed so as to receive reflected light that travels in the vertical direction from the incidence position P of the document ScL at which the incident light I is incident. However, the incident angle of the incident light I from the second light source 22*b* and the position of arrangement of the image sensor 24 are not limited thereto as long as the light amount of the regularly reflected light R from the document ScL acquired by the image sensor 24 is equal to or more than the predetermined regularly reflected light amount threshold, or as long as the light amount of the regularly reflected light R from the document ScL acquired by the image sensor 24 is equal to or more than that in the first reading environment.

Pixel values (e.g. lightness) of corresponding pixels are considerably different between the glossy region GR of image data (e.g. the first read image data SIa) acquired in the first reading environment and the glossy region GR of image data (e.g. the second read image data SIb) acquired in the second reading environment. Pixel values of corresponding pixels are also different between the non-glossy region NGR of image data acquired in the first reading environment and the non-glossy region NGR of image data acquired in the second reading environment. However, the difference in the corresponding pixel values between image data acquired in the first reading environment and image data acquired in the second reading environment is much larger for the glossy region GR than for the non-glossy region NGR. Thus, in the glossy region GR, the difference in the pixel values between image data obtained by optically reading the document in the first reading environment and image data obtained by optically reading the document in the second reading environment is considered to be equal to or more than a pixel value threshold. The pixel value threshold is set to a value that is larger than the difference in the pixel values between the non-glossy region NGR of image data acquired in the first reading environment and the non-glossy region NGR of image data acquired in the second reading environment for an identical document, and that is smaller than the difference in the pixel values between the glossy region GR of image data acquired in the first reading environment and the glossy region GR of image data acquired in the second reading environment for an identical document. In the non-glossy region NGR, on the other hand, the difference in the pixel values between image data obtained by optically reading the document in the first reading environment and image data obtained by optically reading the document in the second reading environment is considered to be less than the pixel value threshold.

Returning to FIG. 1, the general scanner 14 is an image reading device that optically reads a document such as a paper medium to acquire read image data that represent the document, as with the learning data-acquisition scanner 12.

The general scanner 14 scans a process target document set by a user, and transmits process target image data, which are read image data, to the information processing apparatus 16. In particular, the general scanner 14 executes the scan process in the first reading environment. That is, the general scanner 14 may be equivalent to an image reading device (see FIG. 15) commonly used in the related art. The general scanner 14 may be any device that is capable of executing the scan process in the first reading environment. For example, the general scanner 14 may be a scanner, a multi-function device that has a scan function, etc. While one general scanner 14 is illustrated in FIG. 1, the information processing system 10 may include a plurality of general scanners 14 to be used by a plurality of users.

The general scanner 14 includes an input interface 14*a* and a display 14*b*. The input interface 14*a* is configured to include a button, a touch screen, etc., for example. The input interface 14*a* is used to input an instruction from the user to the general scanner 14. The display 14*b* is configured to include a liquid crystal display etc., for example. The display 14*b* displays a variety of screens including a variety of information. For example, the display 14*b* displays image data that have been processed by the information processing apparatus 16.

Figure 7:
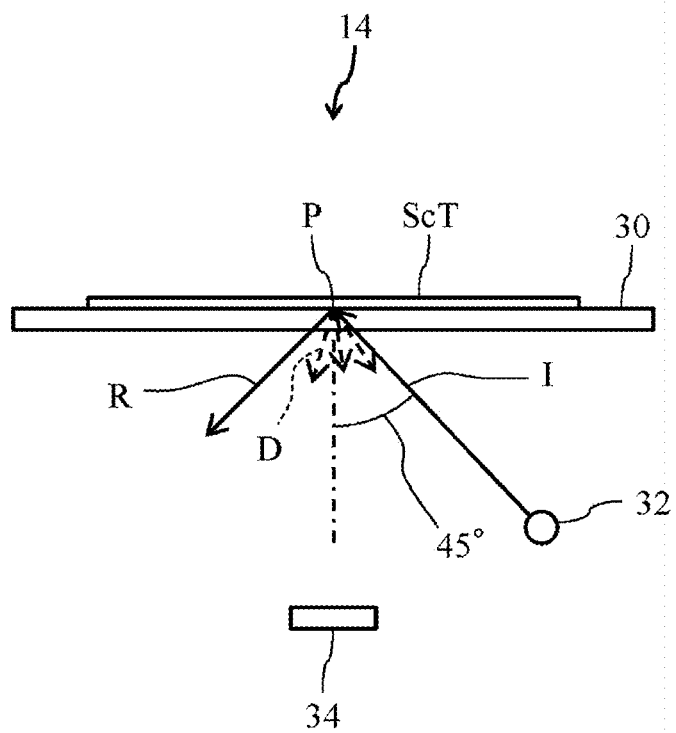
FIG. 7 is a schematic diagram illustrating the structure of a general scanner.

FIG. 7 is a schematic diagram illustrating the structure of the general scanner 14. The general scanner 14 is configured to include a document platen 30, a light source 32, and an image sensor 34. The document platen 30, the light source 32, and the image sensor 34 are equivalent to the document platen 20, the first light source 22*a*, and the image sensor 24, respectively, of the learning data-acquisition scanner 12, and therefore are not described in detail. Herein, a document to be read by the general scanner 14 is referred to as a "process target document ScT", and read image data generated by the general scanner 14 reading the document ScT are referred to as "process target image data".

Figure 15:
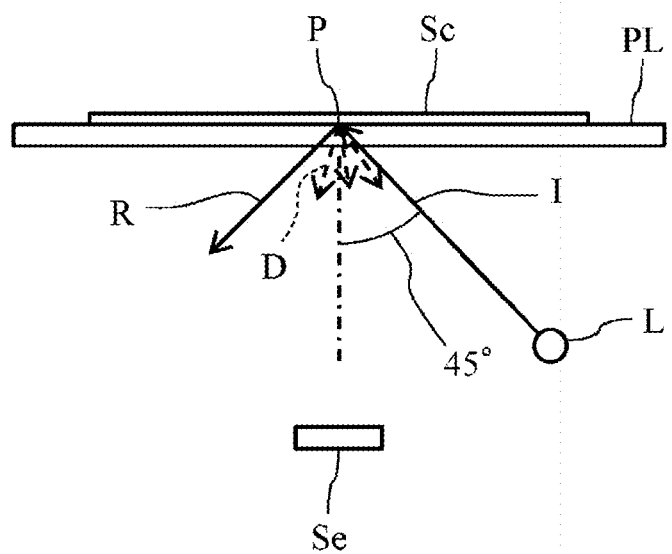
FIG. 15 is a conceptual diagram illustrating the structure of an image reading device according to the related art.

As discussed above, the general scanner 14 may be equivalent to an image reading device according to the related art (also see FIG. 15). That is, the light source 32 is disposed such that the incident angle, which is the angle between the travel direction of incident light I radiated from the light source 32 and a direction (direction indicated by the dot-and-dash line in FIG. 7) that is perpendicular to the document ScT which is placed on the document platen 30 is 45°. Consequently, the reflection angle of regularly reflected light R reflected from a surface (specifically, the incidence position P) of the document ScT (angle between the regularly reflected light R and a direction that is perpendicular to the document ScT which is placed on the document platen 30) is also 45°. Thus, the image sensor 34 which is disposed so as to receive reflected light that travels in the vertical direction from the incidence position P of the document ScT at which the incident light I is incident does not substantially receive the regularly reflected light R due to light from the light source 32. On the other hand, the image sensor 34 receives a greater amount of the diffused reflected light D due to light from the light source 32, which is indicated by the broken lines in FIG. 7 (in a light amount that is at least greater than the light amount of the regularly reflected light R).

That is, the general scanner 14 performs the scan process on the document ScT in the first reading environment. Thus, in the process target image data that have been read by the general scanner 14, as in the first read image data SIa illustrated in FIG. 4, the non-glossy region NGR is expressed suitably, but the glossy texture of the glossy region GR is not expressed suitably.

Figure 8:
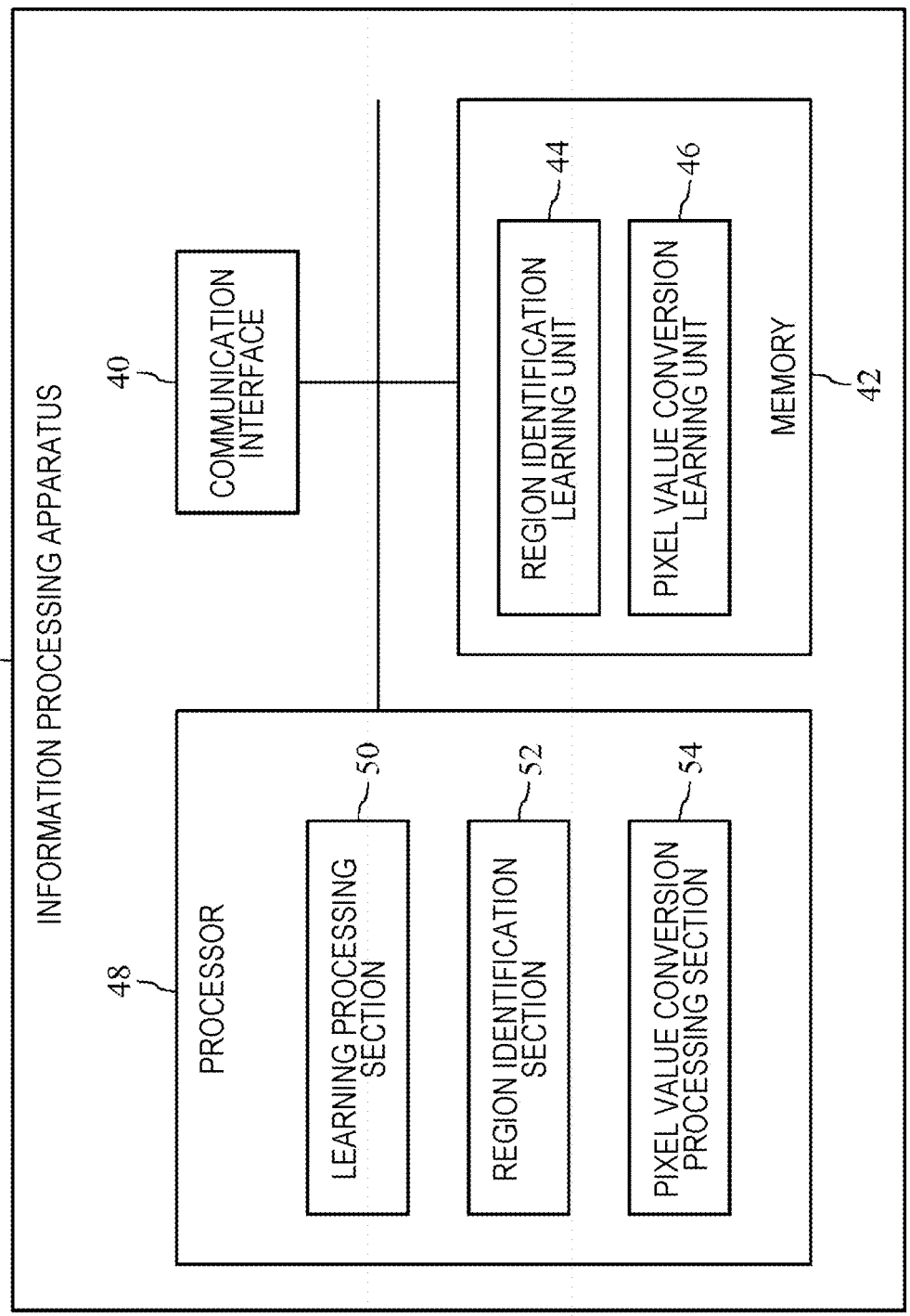
FIG. 8 illustrates a schematic configuration of an information processing apparatus according to the present exemplary embodiment.

FIG. 8 illustrates a schematic configuration of the information processing apparatus 16. In the present exemplary embodiment, the information processing apparatus 16 is a server computer. However, the information processing apparatus 16 may be any device that is capable of executing a process of expressing the glossy texture of the glossy region GR in the process target image data using the learning unit to be described below. For example, the information processing apparatus 16 may be a personal computer etc. The function achieved by the information processing apparatus 16 may be implemented through cooperation of a plurality of computers.

A communication interface 40 is configured to include a network adapter etc., for example. The communication interface 40 achieves a function of communicating with other devices, e.g. the learning data-acquisition scanner 12 and the general scanner 14. For example, the communication interface 40 receives the first read image data SIa and the second read image data SIb from the learning data-acquisition scanner 12, and receives the process target image data from the general scanner 14. The communication interface 40 also receives instruction information (to be discussed in detail later), which indicates an instruction input from the user to the general scanner 14, from the general scanner 14. Further, the communication interface 40 transmits the process target image data that have been processed to the general scanner 14 or a user terminal that is used by the user.

A memory 42 is configured to include a hard disk drive (HDD), a solid state drive (SSD), a read only memory (ROM), a random access memory (RAM), etc., for example. The memory 42 may be provided separately from a processor 48 to be discussed later, or at least a part of the memory 42 may be provided in the processor 48. The memory 42 stores an information processing program that allows various portions of the information processing apparatus 16 to operate. As illustrated in FIG. 8, the memory 42 stores a region identification learning unit 44 and a pixel value conversion learning unit 46.

The region identification learning unit 44, which serves as a second learning unit, is a learning unit to be trained using second learning data enough to be able to identify the glossy region GR and the non-glossy region NGR in the process target image data generated by the general scanner 14. Examples of the region identification learning unit 44 include SegNet (https://arxiv.org/abs/1511.00561) proposed by Vijay Badrinarayanan et al. The SegNet is trained using, as learning data, image data in which each pixel is given a label that indicates the characteristic of the pixel to give each pixel of input image data a label that indicates the characteristic of the pixel. When applied to the present exemplary embodiment, the SegNet is trained using, as second learning data, image data in which each pixel is given a label that indicates whether the pixel is a pixel in the glossy region GR or a pixel in the non-glossy region NGR, to be able to identify whether each pixel of input image data is a pixel in the glossy region GR or a pixel in the non-glossy region NGR.

Figure 9:
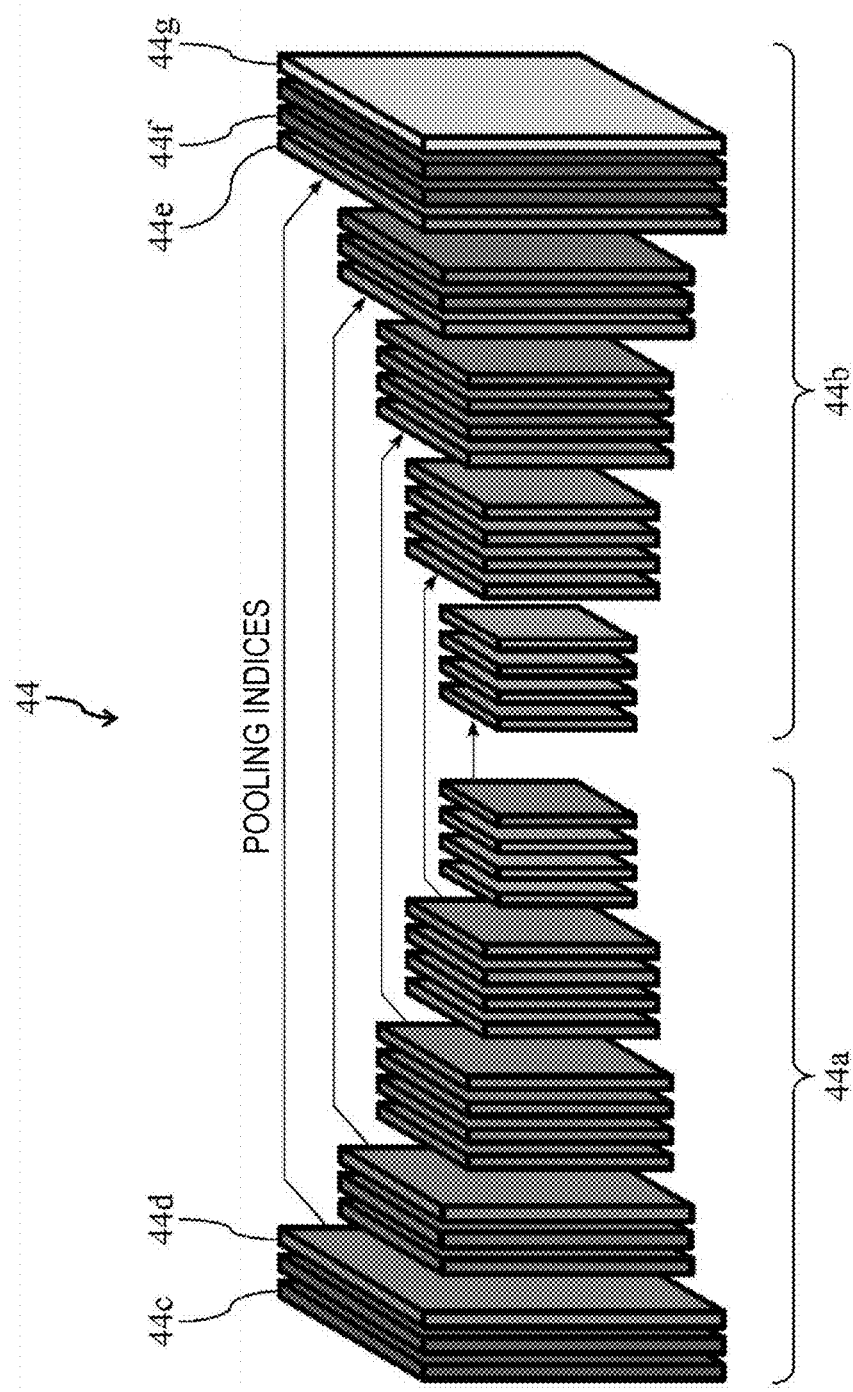
FIG. 9 is a conceptual diagram illustrating an example of the structure of a region identification learning unit.

FIG. 9 is a conceptual diagram illustrating an example of the structure of the region identification learning unit 44. The region identification learning unit 44 is a neural network, more particularly a convolutional neural network, constituted from a plurality of layers. The region identification learning unit 44 is composed of an encoder 44*a* that is constituted from a plurality of layers and that extracts the characteristic of the content of input image data on the basis of the pixel values of pixels of the input image data, and a decoder 44*b* that is also constituted from a plurality of layers and that gives a label to the pixels of the input image data on the basis of the extracted characteristic.

The encoder 44a is configured to include an arrangement of a plurality of combinations each including a plurality of convolutional layers 44c and a pooling layer 44d. The convolutional layers 44c perform a process of performing a filter process on the input image data to extract a characteristic prescribed by the filter from the input image data to generate a characteristic map. The pooling layer 44d performs a process of down-sampling (reducing the number of pixels) the characteristic map generated by the convolutional layers 44c. The pooling layer 44d performs down-sampling in which the number of pixels is reduced to one-fourth by extracting, as one pixel, the largest one of the pixel values of four (two by two) pixels of the characteristic map. The pooling layer 44d holds information called "pooling indices" that indicates the pixel value of which of the four pixels has been extracted.

The decoder 44b is configured to include an arrangement of a plurality of combinations each including an up-sampling layer 44e and a plurality of convolutional layers 44f, and a soft-max layer 44g provided at the final output stage. The up-sampling layer 44e performs a process of enlarging the characteristic map which has been reduced by the pooling layer 44d. The up-sampling layer 44e enlarges one pixel of the reduced characteristic map to four (two by two) pixels. The up-sampling layer 44e receives the pooling indices discussed above from the corresponding pooling layer 44d, and disposes the pixel value of the one pixel of the reduced characteristic map at a position indicated by the pooling indices, among the four pixels. The convolutional layers 44f perform a process of compensating for blank pixels (in the present example, three pixels other than the pixel at which a pixel value was disposed by the up-sampling layer 44e, among the four pixels) of the characteristic map which has been enlarged by the up-sampling layer 44e with pixel values. The soft-max layer 44g outputs the possibility of each label for each pixel of the input image data on the basis of the characteristic map obtained by the final convolutional layer 44f. If a label with the highest possibility is given to each pixel, the soft-max layer 44g gives the label to each pixel of the input image data.

The method of training the region identification learning unit 44 will be discussed later together with a process by the processor 48.

The pixel value conversion learning unit 46, which serves as a first learning unit, is a learning unit to be trained using first learning data enough to be able to convert the process target image data generated by the general scanner 14 (i.e. image data that are equivalent in the image quality to the first read image data SIa (see FIG. 4)) into image data that are equivalent in the image quality to the second read image data SIb (see FIG. 6), that is, to convert the pixel values of pixels. As discussed above, the second read image data SIb are image data in which the glossy texture of the glossy region GR is expressed suitably compared to the first read image data SIa. Thus, when a focus is placed on only the glossy region GR, the pixel value conversion learning unit 46 which has been trained is considered to be able to convert the pixel values of pixels in the glossy region GR such that the glossy texture of the glossy region GR of the process target image data is expressed more suitably.

Examples of the pixel value conversion learning unit 46 include Image-to-Image Translation with Conditional Adversarial Networks (https://arxiv.org/pdf/ 1611.07004.pdf) proposed by Phillip Isola et al. The Image-to-Image Translation with Conditional Adversarial Networks learns the relationship between a first characteristic of first image data and a second characteristic of second image data using, as learning data, a pair of the first image data and the second image data to convert input image data that have the first characteristic into image data that have the second characteristic, or convert input image data that have the second characteristic into image data that have the first characteristic. When applied to the present exemplary embodiment, the Image-to-Image Translation with Conditional Adversarial Networks learns, as the first learning data, the first read image data SIa characterized by such an image quality that the glossy texture of the glossy region GR is not expressed suitably and the second read image data SIb characterized by such an image quality that the glossy texture of the glossy region GR is expressed suitably, the first and second read image data SIa and SIb being acquired by the learning data-acquisition scanner 12, to be able to convert input image data with such an image quality that the glossy texture of the glossy region GR is not expressed suitably into image data with such an image quality that the glossy texture of the glossy region GR is expressed suitably.

Figure 10:
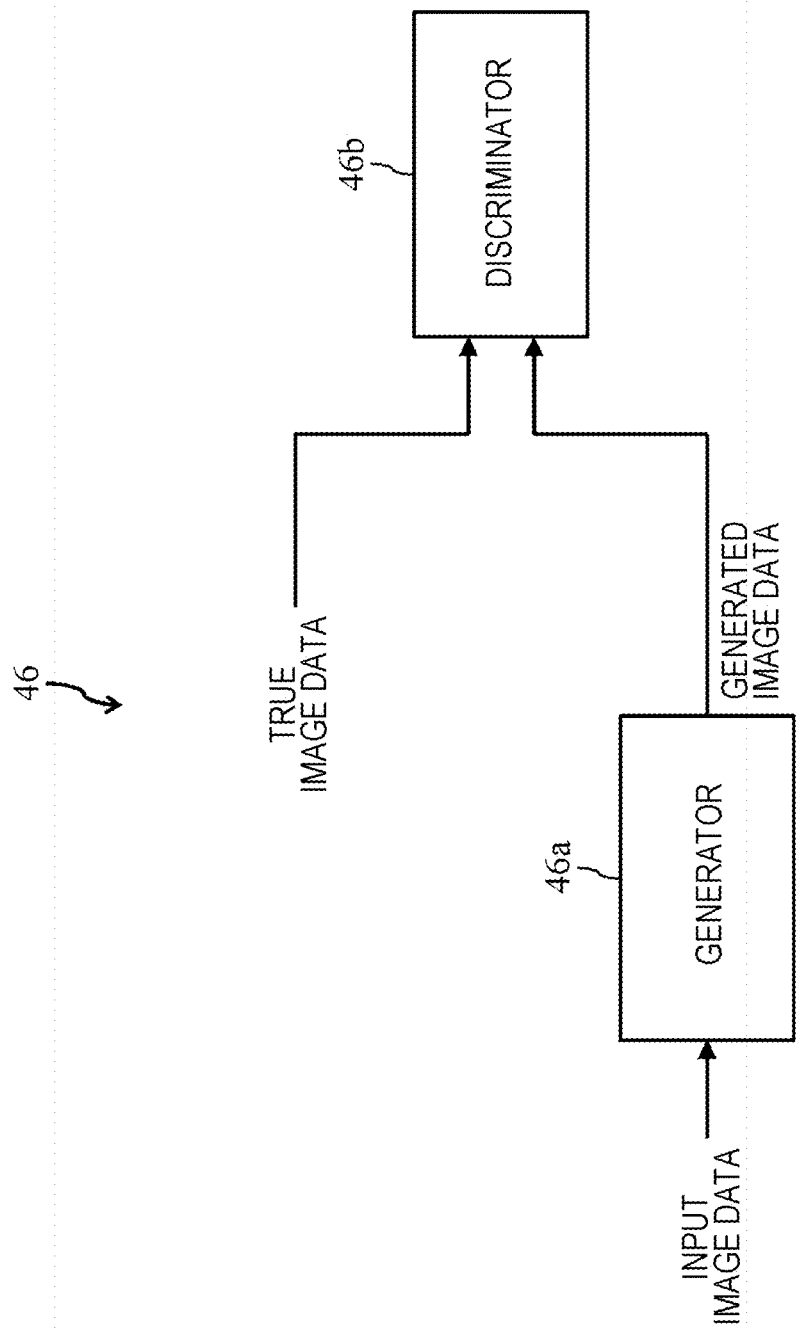
FIG. 10 is a conceptual diagram illustrating an example of the structure of a pixel value conversion learning unit.

FIG. 10 is a conceptual diagram illustrating an example of the structure of the pixel value conversion learning unit 46. The pixel value conversion learning unit 46 is configured to include Generative Adversarial Networks (GANs). That is, the pixel value conversion learning unit 46 is configured to include a generator 46a that generates generated image data on the basis of input image data, and a discriminator 46b that determines which of the generated image data and true image data are the image data generated by the generator 46a. The generator 46a is trained so as to generate generated image data that may deceive the discriminator 46b (i.e. such that the discriminator 46b does not determine that the generated image data are generated by the generator 46a). Meanwhile, the discriminator 46b is trained so as to be able to make more precise determinations.

The method of training the pixel value conversion learning unit 46 will also be discussed later together with a process by the processor 48.

Returning to FIG. 8, the processor 48 refers to hardware in a broad sense. The processor 48 is configured to include at least one of general processing devices (e.g., CPU: Central Processing Unit) and dedicated processing devices (e.g., GPU: Graphics Processing Unit, ASIC: Application Specific Integrated Circuit, FPGA: Field Programmable Gate Array, and programmable logic device). The processor 48 may not be a single processing device, and may be a plurality of processing devices in collaboration which are located physically apart from each other but may work cooperatively. As illustrated in FIG. 8, the processor 48 achieves a function of a learning processing section 50, a region identification section 52, and a pixel value conversion processing section 54 in accordance with the information processing program stored in the memory 42.

The learning processing section 50 trains the region identification learning unit 44 using the second learning data so as to be able to detect the glossy region GR from the process target image data. In the present exemplary embodiment, image data in which pixels in the glossy region GR are given a first label indicating that such pixels are in the glossy region GR and pixels in the non-glossy region NGR are given a second label, which is different from the first label, indicating that such pixels are in the non-glossy region NGR are used as the second learning data.

The first read image data SIa or the second read image data SIb acquired by the learning data-acquisition scanner 12 may be used as the second learning data. The pixels in the first read image data SIa and the second read image data SIb are not given a first label or a second label. Therefore, it is necessary to give a first label or a second label to the pixels in the first read image data SIa or the second read image data SIb by a different method (e.g. manually).

In order to save the trouble of giving a first label or a second label to the first read image data SIa or the second read image data SIb, image data generated by combining pixels included in the glossy region GR and having been given a first label and pixels included in the non-glossy region NGR and having been given a second label may be used as the second learning data.

Figure 11:
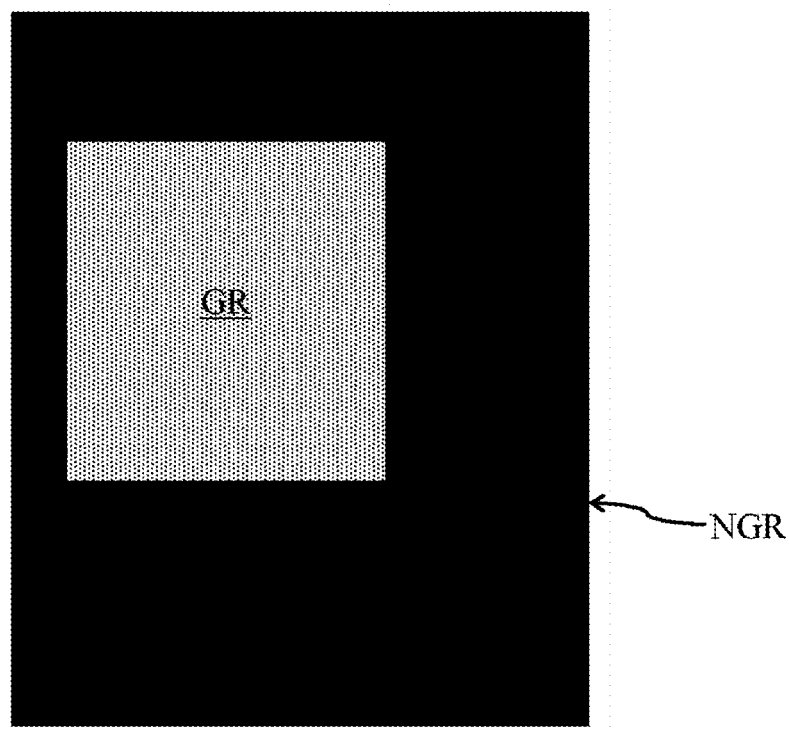
FIG. 11 illustrates an example of second learning data.

For example, first, full glossy image data in which the entire surface (i.e. all the pixels) is the glossy region GR and a first label has been given to all the pixels and full non-glossy image data in which the entire surface is the non-glossy region NGR and a second label has been given to all the pixels are prepared. Then, a partial region of the full non-glossy image data is replaced with pixels in the full glossy image data. Consequently, second learning data that include the glossy region GR which is composed of pixels given a first label and the non-glossy region NGR which is composed of pixels given a second label, as illustrated in FIG. 11, may be obtained. Alternatively, a partial region of the full glossy image data may be replaced with pixels in the full non-glossy image data to obtain second learning data. A variety of second learning data may be obtained by variously changing the position or the size of the region to be replaced.

When the learning processing section 50 trains the region identification learning unit 44 using the second learning data, the region identification learning unit 44 which has been trained sufficiently is able to give a first label to the glossy region GR and a second label to the non-glossy region NGR in the process target image data. That is, it is possible to detect the glossy region GR in the process target image data.

The learning processing section 50 trains the pixel value conversion learning unit 46 using the first learning data, which include the first read image data SIa and the second read image data SIb generated by the learning data-acquisition scanner 12, so as to convert the first read image data SIa into the second read image data SIb, specifically so as to be able to convert the image quality of the first read image data SIa to the image quality of the second read image data SIb. This process is specifically described with reference to FIG. 10. First, the learning processing section 50 inputs the first read image data SIa to the generator 46a. The generator 46a generates generated image data in which the pixel values of pixels of the first read image data SIa have been converted. The discriminator 46b compares the generated image data and the second read image data SIb input by the learning processing section 50 as true image data, and determines which of the generated image data and the second read image data SIb are the image data generated by the generator 46a. Parameters of the generator 46a and the discriminator 46b are updated (i.e. trained) on the basis of the result of the determination by the discriminator 46b.

When the learning processing section 50 trains the pixel value conversion learning unit 46 using the first learning data, the pixel value conversion learning unit 46 which has been trained sufficiently is able to convert the image quality of the process target image data acquired in the first reading environment to be equivalent to the image quality of the image data acquired in the second reading environment.

The learning processing section 50 may train the pixel value conversion learning unit 46 using the first learning data, which include supplementary information that indicates the image quality of the second read image data SIb, in addition to the first read image data SIa and the second read image data SIb. The supplementary information may include information that indicates the color tint, lightness, etc. of the second read image data SIb, for example. The supplementary information may also be considered as information that indicates the degree of the glossy texture of the glossy region GR of the second read image data SIb.

The learning processing section 50 inputs the supplementary information to the generator 46a together with the first read image data SIa. The generator 46a may generate generated image data in consideration of the supplementary information, and learn the relationship between the supplementary information and the second read image data SIb on the basis of the result of the determination on the generated image data by the discriminator 46b. Consequently, it is possible for the generator 46a to generate generated image data with an image quality that matches an instruction related to the image quality from the user.

The learning processing section 50 may train different pixel value conversion learning units 46 for each supplementary information. For example, a first pixel value conversion learning unit 46 may be trained using first learning data including supplementary information "brighter", and a second pixel value conversion learning unit 46 may be trained using first learning data including supplementary information "darker". With such a configuration, a plurality of pixel value conversion learning units 46 that have been trained in accordance with the supplementary information are formed.

Figure 12:
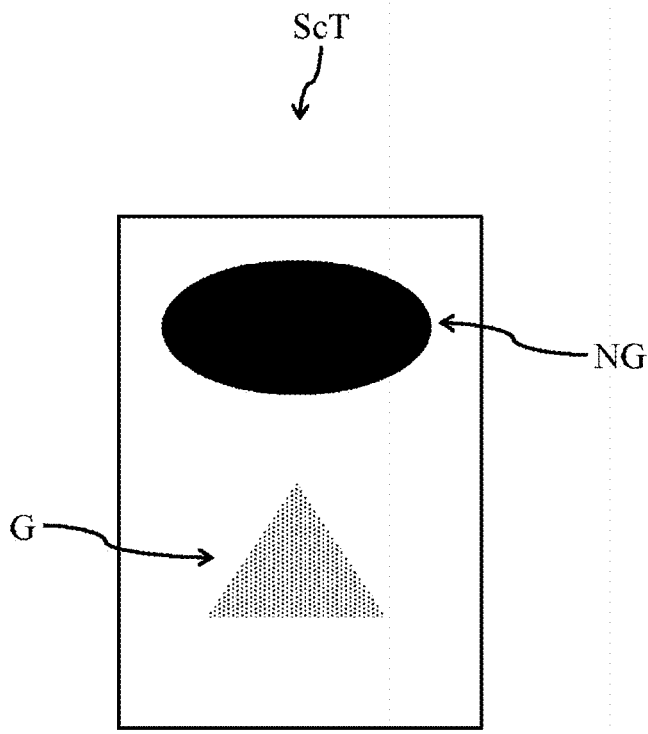
FIG. 12 illustrates an example of a process target document.

Returning to FIG. 8, the region identification section 52 performs a detection process of detecting the glossy region GR corresponding to the glossy portion G of the process target document ScT from the process target image data generated by the general scanner 14. In the following description, the process target document ScT is as illustrated in FIG. 12. That is, the process target document ScT in the following description is assumed to include both the glossy portion G and the non-glossy portion NG. The process target document ScT may have the glossy portion G over the entire surface thereof.

In the present exemplary embodiment, the region identification section 52 detects the glossy region GR from the process target image data using the region identification learning unit 44 which has been trained. Specifically, the region identification section 52 inputs the process target image data to the region identification learning unit 44 which has been trained, to detect a collection of pixels to which a first label has been given by the region identification learning unit 44 as the glossy region GR.

The region identification section 52 may detect the glossy region GR from the process target image data by a method other than the method in which the region identification learning unit 44 is used. For example, the user may manually specify the glossy region GR in the process target image data, and the region identification section 52 may determine the region specified by the user as the glossy region GR.

An upper limit value (e.g. 512×512 pixels) of the size of image data that may be input to the region identification learning unit 44 is occasionally determined because of a constraint due to the structure of the region identification learning unit 44. Thus, the entire process target image data may not be input to the region identification learning unit 44 at a time, depending on the size of the process target image data. In this case, the region identification section 52 divides the process target image data into a plurality of divided regions (which are herein referred to as "blocks"), and consecutively inputs the plurality of blocks to the region identification learning unit 44 to detect the glossy region GR from the process target image data. As a matter of course, the region identification section 52 divides the process target image data into a plurality of blocks such that the size of each block is smaller than the size of a block that may be input to the region identification learning unit 44.

The precision of a label to be given to pixels positioned at the outer peripheral edge of each block is occasionally low because of the smaller number of the surrounding pixels. Consequently, the detectability of the glossy region GR in the pixels positioned at the outer peripheral edge of each block is occasionally low. When the glossy region GR is to be detected for each block, the glossy region GR may not be detected suitably from the block in the case where the tendency of distribution of the glossy region GR and the non-glossy region NGR in each block is not found in the learning data that have been used so far. For example, it is conceivable that all of a single block is in the glossy region GR. It is difficult for the region identification learning unit 44 to identify the entire block as the glossy region GR in the case where the region identification learning unit 44 has not been trained using the second learning data in which the entire surface is in the glossy region GR.

In order to reduce the effect of the issue which may be caused when the process target image data are divided into a plurality of blocks and the blocks are consecutively input to the region identification learning unit 44 as described above, the region identification section 52 may detect the glossy region GR from the process target image data on the basis of a first provisional glossy region obtained on the basis of a plurality of outputs of the region identification learning unit 44 obtained when a group of first blocks obtained by dividing the process target image data at a first dividing position are consecutively input to the region identification learning unit 44, and a second provisional glossy region obtained on the basis of a plurality of outputs of the region identification learning unit 44 obtained when a group of second blocks obtained by dividing the process target image data at a second dividing position, which is different from the first dividing position, are consecutively input to the region identification learning unit 44. As a matter of course, the region identification section 52 may detect the glossy region GR from the process target image data on the basis of three or more provisional glossy regions obtained by dividing the process target image data at three or more mutually different dividing positions and inputting groups of blocks to the region identification learning unit 44.

In order to further reduce the effect of the above issue, the region identification section 52 further detects the glossy region GR from the process target image data on the basis of a third provisional glossy region obtained by inputting low-resolution process target image data, which are obtained by reducing the resolution of the process target image data, to the region identification learning unit 44.

The above process will be described in detail with reference to FIG. 13. Two process target image data TI obtained by the general scanner 14 reading the process target document ScT illustrated in FIG. 12 are illustrated in the upper part of FIG. 13. The two process target image data TI are divided into a plurality of blocks B at dividing positions indicated by the dot-and-dash lines. It should be noted that the two process target image data TI have mutually different dividing positions. Thus, pixels at the outer peripheral edge of each block B obtained from one of the process target image data TI and pixels at the outer peripheral edge of each block B obtained from the other process target image data TI are different from each other.

Consequently, pixels in which the detectability of the glossy region GR is reduced when a group of first blocks B obtained from one of the process target image data TI are consecutively input to the region identification learning unit 44 and pixels in which the detectability of the glossy region GR is reduced when a group of second blocks B obtained from the other process target image data TI are consecutively input to the region identification learning unit 44 are different from each other. Thus, by detecting the glossy region GR on the basis of both the first provisional glossy region which is obtained by consecutively inputting the group of first blocks B, which are obtained from one of the process target image data TI, to the region identification learning unit 44 and the second provisional glossy region which is obtained by consecutively inputting the group of second blocks B, which are obtained from the other process target image data TI, to the region identification learning unit 44, respective portions in which the detectability of the glossy region GR is low are compensated for to reduce the effect of such portions. In the present exemplary embodiment, the region identification learning unit 44 often determines pixels that are truly in the glossy region GR erroneously as in the non-glossy region NGR, but rarely determines pixels that are truly in the non-glossy region NGR erroneously as in the glossy region GR. Therefore, a region obtained by taking the logical sum of the first provisional glossy region and the second provisional glossy region is determined as the glossy region GR.

Figure 13:
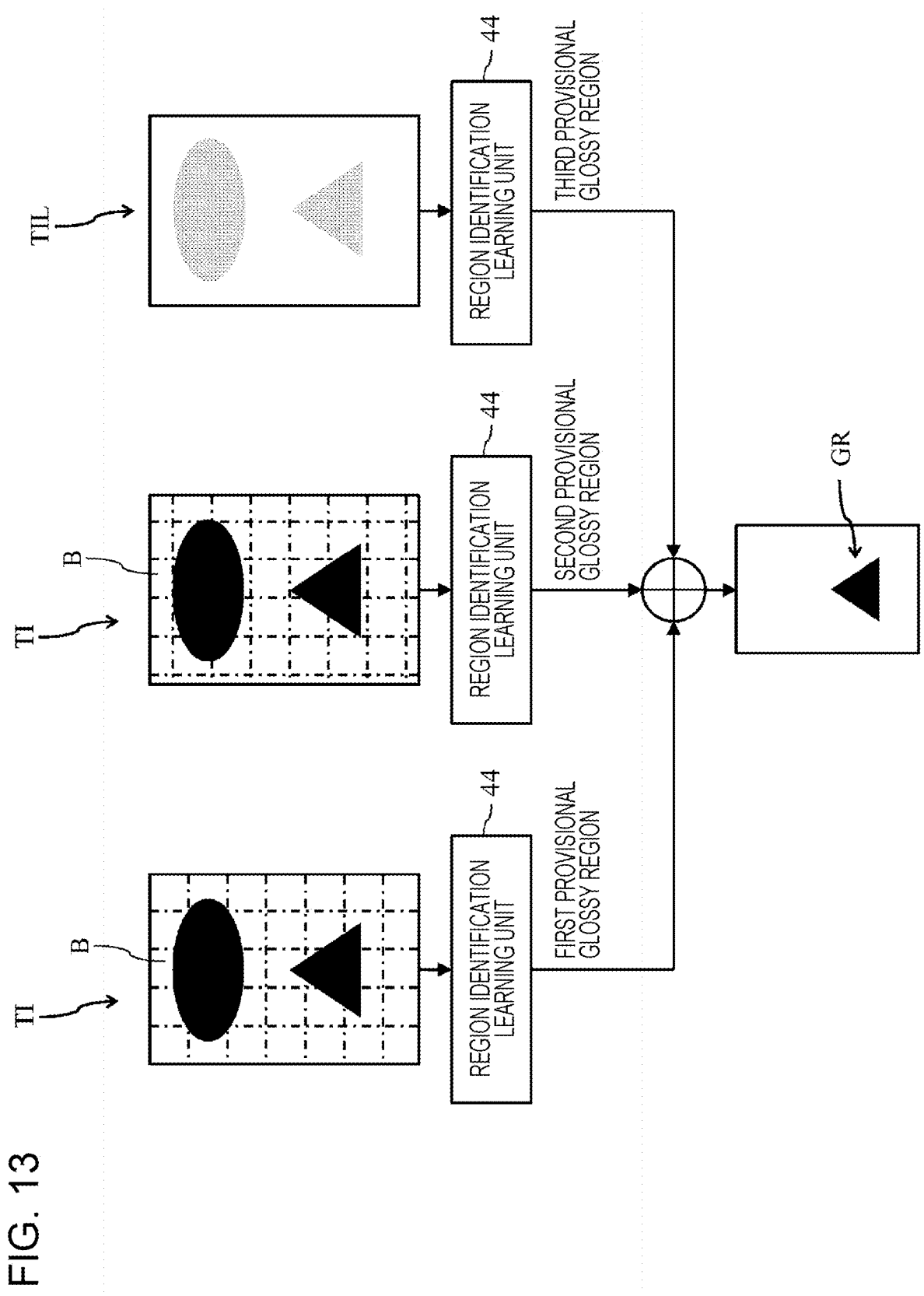
FIG. 13 illustrates the flow of a process by a region identification section according to a modification.

Low-resolution process target image data TIL obtained by reducing the resolution of the process target image data TI are also illustrated in the upper part of FIG. 13. The low-resolution process target image data TIL are sized so as to be input to the region identification learning unit 44, and has a size of 512×512 pixels, for example. A third provisional glossy region is obtained by inputting the low-resolution process target image data TIL to the region identification learning unit 44.

In the low-resolution process target image data TIL, the resolution has been lowered for the entire image data, but the detectability of the glossy region GR is not reduced in specific pixels unlike the case where the process target image data TI are divided into a group of blocks B to be input to the region identification learning unit 44. Thus, by obtaining the glossy region GR in consideration of the third provisional glossy region in addition to the first provisional glossy region and the second provisional glossy region, respective portions of the first provisional glossy region and the second provisional glossy region in which the detectability of the glossy region GR is low are compensated for to reduce the effect of such portions.

Returning to FIG. 8 again, the pixel value conversion processing section 54 performs a conversion process of converting the pixel values of pixels in the glossy region GR so as to express the glossy texture of the glossy region GR in the process target image data generated by the general scanner 14. Specifically, the pixel value conversion processing section 54 converts the pixel values of pixels in the glossy region GR of the process target image data by inputting, to the pixel value conversion learning unit 46 which has been trained, the process target image data and information that indicates the glossy region GR of the process target image data detected by the region identification section 52.

Inputting the process target image data and information that indicates the glossy region GR of the process target image data detected by the region identification section 52 may include generating glossy image data, which are obtained by extracting the glossy region GR from the process target image data, on the basis of a detection process by the region identification section 52 and inputting the glossy image data to the pixel value conversion learning unit 46 which has been trained, or may include inputting, to the pixel value conversion learning unit 46 which has been trained, the process target image data and mask data which are information that indicates the glossy region GR of the process target image data.

When the pixel value conversion processing section 54 inputs, to the pixel value conversion learning unit 46 which has been trained, the process target image data and information that indicates the glossy region GR of the process target image data detected by the region identification section 52, the pixel value conversion learning unit 46 converts the image quality of only the glossy region GR, among the process target image data, to be equivalent to the image quality of the image data acquired in the second reading environment. That is, the pixel values of pixels in the glossy region GR are converted such that the glossy texture of the glossy region GR is expressed suitably. Thus, it is possible for the pixel value conversion processing section 54 to obtain process target image data in which the glossy texture of the glossy region GR is expressed suitably.

As discussed above, the pixel value conversion processing section 54 performs a conversion process on the glossy region GR of the process target image data detected by the region identification section 52. However, the user may be able to specify a partial region of the process target image data using the input interface 14*a* of the general scanner 14. In this case, specified region information that indicates the specified region is transmitted from the general scanner 14 to the information processing apparatus 16, and the pixel value conversion processing section 54 further inputs the specified region information to the pixel value conversion learning unit 46. The pixel value conversion processing section 54 may convert the pixel values of pixels in the glossy region GR of the process target image data detected by the region identification section 52 and in the region specified in the specified region information. Consequently, it is possible to obtain process target image data in which the glossy texture of only a part of the glossy region GR of the process target image data specified by the user is expressed, rather than the entire glossy region GR of the process target image data detected by the region identification section 52, for example.

In the case where the pixel value conversion learning unit 46 has been trained using first learning data including supplementary information, the user may acquire process target image data by causing the general scanner 14 to read the process target document ScT, and input an instruction related to the image quality after conversion of the glossy region GR of the process target image data using the input interface 14*a* of the general scanner 14. An instruction such as "brighter" or "darker" or related to the color tint etc. is input, for example. In this case, the general scanner 14 transmits, to the information processing apparatus 16, instruction information that indicates the instruction in association with the process target image data.

In this case, the pixel value conversion processing section 54 inputs the process target image data and the instruction information to the pixel value conversion learning unit 46. Consequently, it is possible for the pixel value conversion learning unit 46, which has been trained using the first learning data including the supplementary information, to convert the image quality (in particular, glossy texture) of the glossy region GR of the process target image data to an image quality that matches the instruction information.

In the case where a plurality of pixel value conversion learning units 46 that have been trained and that match mutually different supplementary information are formed, the pixel value conversion processing section 54 may input, to the pixel value conversion learning unit 46 selected on the basis of the instruction information received from the general scanner 14, the process target image data and information that indicates the glossy region GR of the process target image data detected by the region identification section 52.

Figure 14:
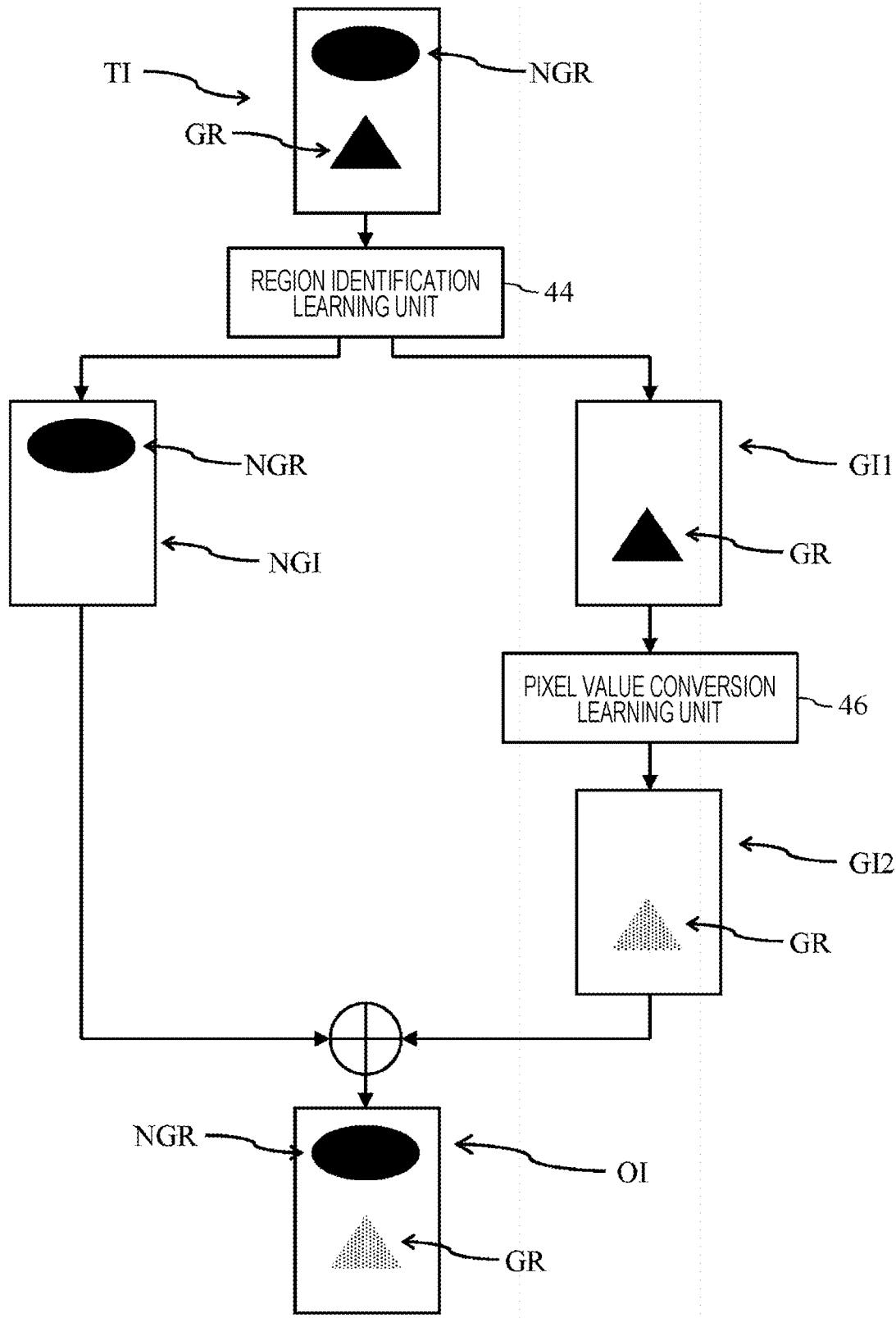
FIG. 14 illustrates the flow of a process by the region identification section and a pixel value conversion processing section.

The flow of a process performed by the region identification section 52 and the pixel value conversion processing section 54 according to the present exemplary embodiment will be described below with reference to FIG. 14. Process target image data TI generated by the general scanner 14 reading the process target document ScT illustrated in FIG. 12 are illustrated in the upper part of FIG. 14. As discussed above, the process target image data TI include a glossy region GR and a non-glossy region NGR, but the glossy texture of the glossy region GR is not expressed suitably.

The region identification section 52 inputs the process target image data TI to the region identification learning unit 44 which has been trained. The region identification learning unit 44 identifies a glossy region GR and a non-glossy region NGR from the process target image data TI. The region identification learning unit 44 generates glossy image data GI1 that include only the extracted glossy region GR and non-glossy image data NGI that include the extracted non-glossy region NGR.

The pixel value conversion processing section 54 inputs the glossy image data GI1 to the pixel value conversion learning unit 46 which has been trained. The pixel value conversion learning unit 46 generates glossy image data GI2 by converting the pixel values of the glossy image data GI1. In the glossy image data GI2, the glossy texture of the glossy region GR is expressed suitably.

The pixel value conversion processing section 54 combines the glossy image data GI2 and the non-glossy image data NGI. Consequently, output image data OI in which the glossy texture of the glossy region GR of the process target image data TI is expressed suitably are generated.

The processor 48 may store the output image data OI in the memory 42, or may transmit the output image data OI to the general scanner 14 or a user terminal that is used by the user. The general scanner 14 may display the output image data OI received from the information processing apparatus 16 on the display 14*b*.

While an exemplary embodiment of the present disclosure has been described above, the present disclosure is not limited to the above exemplary embodiment, and may be modified in various ways without departing from the scope and spirit of the present disclosure.

For example, at least one of the region identification learning unit 44 and the pixel value conversion learning unit 46 may be trained by a device other than the information processing apparatus 16, rather than the learning processing section 50, and the region identification learning unit 44 and the pixel value conversion learning unit 46 which have been trained may be stored in the memory 42. In this case, it is not necessary that the processor 48 should achieve a function as the learning processing section 50.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
convert values of pixels in a glossy region of process target image data by inputting the process target image data to a first learning unit that has been trained using, as first learning data, first read image data and second read image data so as to convert the first read image data into the second read image data, the glossy region corresponding to a glossy portion of a document, the first read image data including the glossy region and being obtained by optically reading the document in a first reading environment in which a light amount of regularly reflected light from a learning data document acquired by an image sensor is less than a regularly reflected light amount threshold, the second read image data including the glossy region and being obtained by optically reading the document in a second reading environment in which the light amount of the regularly reflected light acquired by the image sensor is equal to or more than the regularly reflected light amount threshold, and the process target image data being obtained by optically reading a process target document in the first reading environment.

2. The information processing apparatus according to claim 1,
wherein the processor is configured to convert the pixel values of the pixels in the glossy region of the process target image data by inputting the process target image data and information that indicates the glossy region of the process target image data to the first learning unit which has been trained.

3. The information processing apparatus according to claim 2,
wherein the glossy region is a region in which a difference in pixel values between image data obtained by optically reading the document in the first reading environment and image data obtained by optically reading the document in the second reading environment is equal to or more than a pixel value threshold, and
the non-glossy region is a region in which the difference in the pixel values between the image data obtained by optically reading the document in the first reading environment and the image data obtained by optically reading the document in the second reading environment is less than the pixel value threshold.

4. The information processing apparatus according to claim 2,
wherein the processor is configured to detect the glossy region from the process target image data using a second learning unit that has been trained using, as second learning data, image data in which pixels in the glossy region are given a first label and pixels in the non-glossy region are given a second label that is different from the first label.

5. The information processing apparatus according to claim 4,
wherein the processor is configured to detect the glossy region from the process target image data on a basis of a first provisional glossy region and a second provisional glossy region, the first provisional glossy region being obtained on a basis of a plurality of outputs of the second learning unit obtained when a group of first divided regions obtained by dividing the process target image data at a first dividing position are consecutively input to the second learning unit, and the second provisional glossy region being obtained on a basis of a plurality of outputs of the second learning unit obtained when a group of second divided regions obtained by dividing the process target image data at a second dividing position, which is different from the first dividing position, are consecutively input to the second learning unit.

6. The information processing apparatus according to claim 5,
wherein the processor is configured to detect the glossy region from the process target image data further on a basis of a third provisional glossy region obtained by inputting low-resolution process target image data to the second learning unit, the low-resolution process target image data being obtained by reducing a resolution of the process target image data.

7. The information processing apparatus according to claim 6,
wherein image data that serve as the second learning data are image data generated by combining pixels included in the glossy region and given the first label and pixels included in the non-glossy region and given the second label.

8. The information processing apparatus according to claim 5,
wherein image data that serve as the second learning data are image data generated by combining pixels included in the glossy region and given the first label and pixels included in the non-glossy region and given the second label.

9. The information processing apparatus according to claim 4,
wherein image data that serve as the second learning data are image data generated by combining pixels included in the glossy region and given the first label and pixels included in the non-glossy region and given the second label.

10. The information processing apparatus according to claim 2,
wherein the processor is configured to convert the pixel values of the pixels in the glossy region in accordance with user instruction information about an image quality after conversion of the glossy region of the process target image data, by further inputting the process target image data and the instruction information to the first learning unit which has been trained using, as the first learning data, the first read image data, the second read image data, and supplementary information that indicates an image quality of the second read image data.

11. The information processing apparatus according to claim 10,
wherein the processor is configured to convert the pixel values of the pixels in the glossy region by inputting the process target image data to the first learning unit which has been selected in accordance with the instruction information from among a plurality of first learning units that have been trained using mutually different supplementary information.

12. The information processing apparatus according to claim 1,
wherein the glossy region is a region in which a difference in pixel values between image data obtained by optically reading the document in the first reading environment and image data obtained by optically reading the document in the second reading environment is equal to or more than a pixel value threshold, and
the non-glossy region is a region in which the difference in the pixel values between the image data obtained by optically reading the document in the first reading environment and the image data obtained by optically reading the document in the second reading environment is less than the pixel value threshold.

13. The information processing apparatus according to claim 1,
wherein the processor is configured to convert the pixel values of the pixels in the glossy region in accordance with user instruction information about an image quality after conversion of the glossy region of the process target image data, by further inputting the process target image data and the instruction information to the first learning unit which has been trained using, as the first learning data, the first read image data, the second read image data, and supplementary information that indicates an image quality of the second read image data.

14. The information processing apparatus according to claim 13,
wherein the processor is configured to convert the pixel values of the pixels in the glossy region by inputting the process target image data to the first learning unit which has been selected in accordance with the instruction information from among a plurality of first learning units that have been trained using mutually different supplementary information.

15. An information processing apparatus comprising:
means for converting values of pixels in a glossy region of process target image data by inputting the process target image data to a first learning unit that has been trained using, as first learning data, first read image data and second read image data so as to convert the first read image data into the second read image data, the glossy region corresponding to a glossy portion of a document, the first read image data including the glossy region and being obtained by optically reading the document in a first reading environment in which a light amount of regularly reflected light from a learning data document acquired by an image sensor is less than a regularly reflected light amount threshold, the second read image data including the glossy region and being obtained by optically reading the document in a second reading environment in which the light amount of the regularly reflected light acquired by the image sensor is equal to or more than the regularly reflected light amount threshold, and the process target image data being obtained by optically reading a process target document in the first reading environment.

* * * * *